United States Patent [19]

Berger et al.

[11] Patent Number: 4,900,796
[45] Date of Patent: Feb. 13, 1990

[54] PROCESS FOR PREPARING CHLOROMETHYLATED AROMATIC MATERIALS

[75] Inventors: Scott A. Berger, Langhorne, Pa.; Robert Stewart, Mt. Laurel, N.J.; Richard B. Wuchter, Rydal, Pa.

[73] Assignee: Rohm and Haas Company, Philadelphia, Pa.

[21] Appl. No.: 151,355

[22] Filed: Feb. 2, 1988

[51] Int. Cl.$^4$ ................................................ C08F 8/18
[52] U.S. Cl. ............................ 525/359.3; 525/332.2; 525/332.9; 525/333.3
[58] Field of Search ..................................... 525/359.3

[56] References Cited

U.S. PATENT DOCUMENTS

| | | |
|---|---|---|
| 4,192,921 | 3/1980 | Dales . |
| 4,207,398 | 6/1980 | Riener . |
| 4,225,677 | 9/1980 | Boutier et al. . |
| 4,382,124 | 5/1983 | Meitzner et al. . |
| 4,393,145 | 7/1983 | Zemp . |
| 4,582,859 | 4/1986 | Lein, Jr. et al. . |
| 4,636,554 | 1/1987 | Tada et al. . |

FOREIGN PATENT DOCUMENTS

| | | |
|---|---|---|
| 27643 | 3/1964 | German Democratic Rep. . |
| 113017 | 5/1975 | German Democratic Rep. . |
| 236740 | 6/1986 | German Democratic Rep. . |
| 79140 | 6/1982 | Romania . |
| 942516 | 11/1963 | United Kingdom . |
| 1025635 | 4/1966 | United Kingdom . |
| 1049270 | 11/1966 | United Kingdom . |
| 1162078 | 8/1969 | United Kingdom . |
| 1269986 | 4/1972 | United Kingdom . |

Primary Examiner—Joseph L. Schofer
Assistant Examiner—Bernard Lipman

[57] ABSTRACT

An improved process for chloromethylating an aromatic material comprising introducing in a first closed container the aromatic polymeric material, catalyst for the chloromethylation reaction, and chloromethyl methyl ether in sufficient excess to insure completion of the chloromethylation reaction, and then performing the following series of steps:

a. heating and stirring for sufficient time to substantially complete chloromethylation of the aromatic material,
b. introducing sufficient formaldehyde, methanol, and hydrogen chloride to produce chloromethyl methyl ether in substantially the same amount as that consumed within the closed container,
c. without separation of the aromatic material from the reaction mixture distilling chloromethyl methyl ether from said first closed container into a second closed container,
d. removing chloromethylated aromatic product from said first closed container,
e. introducing a new batch of aromatic material and catalyst for the chloromethylation reaction to said first closed container, and
f. introducing to said first closed container, as the sole source of chloromethyl methyl ether for chloromethylation of said new batch of aromatic material, said chloromethyl methyl ether from said second closed container.

14 Claims, No Drawings

PROCESS FOR PREPARING CHLOROMETHYLATED AROMATIC MATERIALS

BACKGROUND OF THE INVENTION

1. Field of the Invention

This invention relates to an improved process for the chloromethylation of aromatic material, especially vinyl aromatic resins, such resins being useful after subsequent reaction with amines and optionally further reaction with alkyl halides as weak base and strong base anion exchange resins.

2. Description of the Prior Art

Chloromethylation, as used herein, is the reaction of an aromatic polymeric material, e.g., polystyrene, usually crosslinked, and in gellular or porous form, with a reagent which causes the introduction of chloromethyl groups onto the aromatic ring. For many years, a preferred process has employed the reaction of externally or separately prepared chloromethyl methyl ether (optionally "CME" herein) with the polymer, which introduces the chloromethyl groups and produces methanol and other by-products and decomposition products of the CME. Excess chloromethyl methyl ether remaining after the chloromethylation reaction is complete is deactivated or "quenched" and the polymer usually then further reacted to form the desired anion or cation exchange resin. As used herein and in the appended claims "polymer(s)" is intended to include copolymers, particularly insoluble crosslinked copolymers. Products derived from such polymers, such as ion exchange resins, are usually called "resins".

Because the production of chloromethyl methyl ether is usually accompanied by the production of small amounts of the carcinogenic bis(chloromethyl) ether, it is highly desirable to lessen or eliminate the separate or external production of chloromethyl methyl ether and to recover and reutilize unreacted chloromethyl methyl ether from the reaction mixture, especially when excess chloromethyl methyl ether is used in the preparative reaction to increase the extent of chloromethylation and/or to serve as a swelling agent for the polymer to be chloromethylated (see U.S. Pat. No. 4,207,398, issued 6/10/80).

An "in situ" procedure as taught, inter alia, by Boutier et al., U.S. Pat. No. 4,225,677, is known for generation of chloromethyl methyl ether wherein chloromethylating complexes, such as from a mixture of methanol, formaldehyde, and chlorosulfonic acid, are formed in the presence of or with an immediate addition of resin and catalyst. Although such a procedure addresses certain of the toxicity and handling problems associated with external generation of chloromethyl methyl ether, difficulties are encountered in control of the chloromethylation reaction conditions, such as non-uniform reaction of the beads, and in removal of unwanted by-products, such as sulfuric acid. The present process, by cleanly separating the chloromethyl methyl ether generation/regeneration process from the chloromethylation reaction, avoids such process difficulties.

Pascu et al, Romanian Pat. No. 79140, teach addition to the chloromethylated polymer, after completion of the chloromethylation reaction, of concentrated hydrochloric acid and of formaldehyde under specified ratios based on the chloromethylated polymer present, followed by distillation of the resultant mixture to recover chloromethyl methyl ether. The distilled chloromethyl methyl ether is re-used in a second chloromethylation, but further chloromethyl methyl ether must be added to complete the second reaction.

Pashkov et al., British Pat. No. 1,162,078 teach treatment of the waste products remaining from the chloromethylation with methanol prior to distillation, for the purpose of regenerating methylal from the excess chloromethyl methyl ether present. New chloromethyl methyl ether must be generated for a second chloromethylation reaction.

Hauptmann et al, East German Unexamined patent application 113017) teach chloromethylation in the presence of $Fe_2O_3$ or $FeCl_3$ as catalyst, regeneration of the chloromethyl methyl ether by reaction with formaldehyde, methanol and HCl, followed by separation of the solvent and aqueous layers from the resin, followed by subsequent separation of the aqueous layer. They then require treatment of the non-aqueous layer containing crude chloromethyl methyl ether with salts which dry the reactant, and thus allow the use of the chloromethyl methyl ether in a second chloromethylation. Reference is made in this patent to East German Unexamined patent application 27643 which was not available to the inventors; according to the present reference, the earlier patent also teaches non-distillative regeneration, but all available references, including an abstract of East German Unexamined patent application 48593, teach such regeneration is accomplished separately from the chloromethylation and after separation of the reacted resin. Further, the process of East German Unexamined patent application 27643 is shown in East German Unexamined patent application 113017 to produce a poor quality of chloromethyl methyl ether, affecting the quality of beads produced after several recyles.

Weber et al, East German Unexamined patent application 236740, teach chloromethylation in the presence of $FeCl_3$ as catalyst, followed by reaction with methanol, prior to the addition of a stoichiometric amount of paraformaldehyde and HCl gas. The phases are separated but distillation of the newly generated chloromethyl methyl ether is not taught as a means of purifying and recovering the chloromethyl methyl ether; instead, a non-distillative, liquid separation process is taught wherein the $FeCl_3$, $H_2SO_4$, and chloromethyl methyl ether are conducted to the recycle reaction together.

Tada et al, U.S. Pat. No. 4636554, teaches addition of hydrogen chloride in an amount of 0.5 to 10 times (molar) the chloromethyl methyl ether remaining after a conventional chloromethylation reaction, followed by distillation to recover chloromethyl methyl ether. Tada prefers and exemplifies use of solvent; further, Tada regenerates only a portion of the chloromethyl methyl ether necessary to conduct the second chloromethylation. The conditions of Tada will convert some significant portion of the methanol present to methyl chloride ($CH_3Cl$), a volatile gas (bp $-24°$ C.) which would be difficult to recover by the distillation techniques employed and would be lost to the environment.

It is an object of the present invention to provide a process for the chloromethylation of aromatic polymeric material which produces chloromethylated product, which proceeds with commercially acceptable yields and reaction times, and which allows repeated preparations to be made without substantial external generation or handling of chloromethyl methyl ether after the initial preparation.

It is a further object to provide a means for efficiently generating chloromethyl methyl ether in a closed reactor, vessel, or container (i.e., one which does not normally require addition of chloromethyl methyl ether from an external source), and efficiently separating said chloromethyl ether, along with the unusual excess chloromethyl methyl ether from the preparation of the chloromethylated resin, from the product. It is a further object to perform such generation of chloromethyl methyl ether without the by-product formation of significant quantities of highly volatile chemicals such as methyl chloride. It is a further object to perform such efficient generation and handling of chloromethyl methyl ether within the confines of the closed apparatus without adversely affecting the structure of the resin being chloromethylated. It is a further object to accomplish the improved process with limited generation of bis(chloromethyl) ether. It is a further object to accomplish the improved process with limited generation of new chloromethyl methyl ether, the amount generated being only that necessary for reaction with the following batch of resin (including a normal excess for fluidization of the reaction product and optionally for swelling the polymer). In the most preferred embodiment, the methanol formaldehyde and HCl are added to the reaction mixture of the chloromethylation reaction when reaction is essentially complete and in an amount stoichiometrically needed to replenish that amount of chloromethyl methyl ether consumed by reaction with the polymer plus and process losses. Additional reactants may be added to help shift equilibrium of the chloromethyl methyl ether decomposition reactions back toward the formation of CME; thus to utilize the decomposition products remaining in the reaction mixture after chloromethylation to recover "regenerated" CME. The principal object of the invention is therefore to, in a single process step, (1) produce new CME ("formation"), (2) recover CME from the reaction mixture ("recycle") and, (3) recover CME from decomposition products ("regenerate"), at least cumulatively sufficient in quantity to conduct the next chloromethylation reaction.

SUMMARY OF THE INVENTION

These and other objects as will become apparent from the following disclosure are achieved by introducing into a first closed container aromatic polymeric material, catalyst for a chloromethylation reaction, and chloromethyl methyl ether in sufficient amount of excess to insure completion of the chloromethylation reaction, and then:

a. heating and stirring for sufficient time to complete the chloromethylation reaction,
b. introducing sufficient formaldehyde, methanol, and hydrogen chloride to produce additional chloromethyl methyl ether essentially sufficient for the next chloromethylation reaction within the first closed container,
c. distilling the chloromethyl methyl ether from said first closed container into a second closed container,
d. removing chloromethylating aromatic polymer product from said first closed container,
e. introducing a new batch of aromatic material and catalyst for the chloromethylation reaction to said first closed container, and
f. introducing to said first closed container, as essentially the sole source of chloromethyl methyl ether for chloromethylation of said new batch of aromatic material, said chloromethyl methyl ether from said second closed container.

DESCRIPTION OF THE INVENTION AND THE PREFERRED EMBODIMENTS:

Chloromethylated vinyl aromatic polymers prepared by the present invention are not broadly useful in their own right, but have a large number of uses when converted to ion exchange resins. Thus, the chloromethylated intermediate, after separation from the chloromethyl methyl ether reaction mixture and purification to remove traces of chloromethyl methyl ether, may be converted to a weak base resin by reaction with dimethyl amine. Said weak base resin may be further converted to a strong base resin by quaternization with methyl chloride. The chloromethylated intermediates may be converted to strong base resins by direct reaction with a trialkyl amine, may be converted to a phosphonic acid resins by reaction with trimethyl phosphite followed by hydrolysis, or may be hydrolyzed to a resin with pendant hydroxyl groups. All of these steps may be accomplished by well-known technology, and do not form part of the present invention. The resins show utility in, e.g., the purification of boiler water, removal of salts from home water systems, catalysis or organic reactions, etc.

The polymers used in the present invention may represent a wide range of substrates used for chloromethylation. They may be prepared in a variety of ways from vinylaromatic monomers, although suspension polymerization to form polymer beads is preferred. It is preferred that they be at least lightly crosslinked, to avoid dissolution in the chloromethylation methyl ether. The major monomer is usually styrene, although substituted styrenes, such as 4-methylstyrene or 4-chlorostyrene may also be used. Non-aromatic co-monomers may also be utilized in amounts below about 20%, such as (meth)acrylic esters of alcohols or polyols and (meth)acrylonitrile. Crosslinking is generally accomplished with a multifunctional monomer; preferably said monomer is divinylbenzene. Depending on the extent of crosslinking and porosity desired, either commercial divinylbenzene, which is about 55% divinylbenzene with most of the remainder being ethylvinylbenzene, or a higher purity grade (about 80% divinylbenzene) may be chosen.

The resins may be gellular, or may be prepared in a way which introduces fixed porosity, such as by macroporous or macroreticular technology as taught, e.g., in U.S. Pat. No. 124. A process such as taught in Dales, U.S. Pat. No. 4,192,921 or in Barrett et al., U.S. Pat. No. 4,582,859, may be employed to prepare starting polymers for the present chloromethylation process, but the process of the present invention is quite independent of the means for preparing the vinyl aromatic polymer to be chloromethylated.

The present process can be adapted to the preparation of various chloromethylated chemicals of commercial interest. For example, an intermediate in the preparation of biocidally-active quaternary ammonium compounds such as dodecylbenzyltrimethylammonium chloride is chloromethylated dodecylbenzene, which may be prepared by alkylation of benzene with propylene tetramer, followed by reaction of the dodecylbenzene with chloromethyl methyl ether. After completion of the chloromethylation, appropriate amounts of methanol, formaldehyde, and hydrogen chloride could be added, the chloromethyl methyl ether distilled and re-circulated to a second chloromethylation reaction, and the chloromethylated dodecylbenzene passed to an appropriate reactor for reaction with trimethylamine.

Additional solvent which swells the polymer beads may be present, but it is preferred to use chloromethyl methyl ether as solvent and reactant, to minimize distillation and condensation of additional material. Additional methylal, a potential co-reactant and solvent, may be added during the post-reactive stage. Methylal has been found useful in aiding in the extraction of chloromethyl methyl ether imbibed in the resin. Methylal may also be used as an alternative to methanol and formaldehyde. Methylated formalin or "formcel" may be substituted for formaldehyde and methanol in appropriate proportions.

Formaldehyde may be supplied as the monomeric material, in low polymer form (paraformaldehyde) or as the trioxane cyclic trimer. Hydrogen chloride may be used as the gas or as a concentrated aqueous solution.

Catalysis of the chloromethylation may be accomplished by a variety of Lewis or Bronsted acids, such as $AlCl_3$, $ZnCl_2$, $FeCl_3$, $TiCl_4$, $ZnO$, $Fe_2O_3$, $ZrCl_4$, $SnCl_4$, $H_2SO_4$, and the like. The best control of batch-to-batch reproducibility, it is preferred to avoid volatile catalysts such as boron trifluoride. Mixtures of catalysts may be used, as may catalyst adjuncts, such as calcium chloride, activating agents, such as silicon tetrachloride, and the like.

Preferred catalysts are zinc chloride, aluminum chloride, ferric chloride, and ferric oxide. Especially preferred for the present process is ferric oxide. The amount of catalyst used will range from about 0.005 equivalents to about 2.0 equivalents. It is preferred to utilize from about 0.05 to about 0.70 equivalents. It is particularly preferred to utilize from about 0.10 to about 0.40 equivalents with the preferred catalysts.

The chloromethylation may be carried out under conventional conditions, such as from about 15° to about 80° C. for about 1 to about 8 hours. The ratio of chloromethyl methyl ether to resin is from about 2 to at least about 20. The best combination of reactivity and resin swelling is achieved when the ratio is from about 4 to about 9.

As noted below, the stoichiometry of the post-reactive step can be affected by various precursors of formaldehyde, methanol and hydrogen chloride present prior to or formed during the chloromethylation reaction. Such should be considered in calculating the additional amounts of formaldehyde, methanol, and hydrogen chloride required to supply fully the requirements for the continuing chloromethylation sequence. The levels described below are those preferred for ease of operation with the preferred catalyst, but may be adjusted within the scope of the invention so to assure adequate quantities of chloromethyl methyl ether for subsequent reactions.

The post-chloromethylation steps are preferably carried out as follows, all amounts being noted as equivalent of reagent/vinylaromatic equivalent:

(a) Methanol (from about 2 equivalents to about 5 equivalents) and formaldehyde (from about 2 to about 6 equivalents) are added and stirred with the resin to quench the chloromethylation reaction. The methanol and formaldehyde may be added as a mixture, which is commercially available under the designations "Methyl Formcel" or "Elform". The formaldehyde may be added as paraformaldehyde or as trioxane. With suitable adjustments in stoichiometry. Methylal may also be added at this step, although free methanol is preferred to quench the chloromethylation reaction and preserve the bead structure and reactivity. Methylal will be converted by hydrogen chloride to chloromethyl methyl ether; thus methylal present from the chloromethylation reaction will somewhat lower the amounts of additional formaldehyde, methanol, or formaldehyde-methanol generators to be added.

(b) After about one hour, hydrogen chloride, preferably as an anhydrous gas is added (about 4 to about 8 equivalents) over about 2.5 hours to regenerate CME from the decomposition products and form new CME. The level of hydrogen chloride added may be less than about four equivalents if additional hydrogen chloride is generated from other sources. For example, use of aluminum chloride as catalyst in high enough levels will generate hydrogen chloride if water is made available. It is preferred to hold the temperature below about 30° C. The reaction may be held at that temperature for about one hour prior to stripping.

(c) The reaction mix is then subjected to distillation conditions, first at atmospheric or very mild vacuum (ca. 720 mm) and then the temperature is raised to about 70° C. When flow of distillate lessens, vacuum to about 300 mm. to about 600 mm. is applied for about one hour longer or until water begins to distill. It is undesirable to have water present in the distillate to avoid any hydrolysis of the CME. An optional method of recovering the CME is to drain the liquids from the resin prior to distillation. Less CME will be recovered in this manner due to hold-up of CME which may still be present in the swollen resin. Addition of methylal as a wash will aid in the removal of CME, if the optional draining method is used. Direct distillation from the resin slurry is preferred.

(d) The distillate is treated by separatory procedures to remove any lower aqueous layer; said lower layer may be recycled to the kettle during a subsequent stripping operation to aid in fluidizing of the chloromethylated polymer. The non-aqueous distillate may be used directly for a second chloromethylation reaction or may have methylal added (to reach a ratio of about one equivalent per about 4–9 of CME) prior to addition. If methylal is present in the initial charge to the reactor, the conditions taught herein will maintain its concentration in the distillate at about the same ratio and amount as originally charged.

A subsequent chloromethylation may be conducted in a reactor to which resin and catalyst have been charged; the CME is then added to swell and react as in the initial preparation. Alternatively, the CME may be charged to the reactor, and the resin and catalyst added, either together or separately. It is highly preferred that the CME collected, with or without additional methylal, is directly transferred in a closed system to the reactor kettle; it is contemplated that the present invention shall also include those situations where the CME is stored in a closed container until needed for a subsequent chloromethylation.

(e) The stripped resin (after distillation) is cooled, treated with a slow addition of water, washed thoroughly with water, neutralized with base, and then treated in a conventional way, such as with trimethylamine, to form an strong base anion exchange resin.

It should be recognized that the reaction conditions may be varied to an extent depending on the reactivity of the catalyst and of the initial resin chosen, and that the post-chloromethylation steps may vary to an extent, depending on the amount of CME to be generated. Further, although it is preferred to make only as much "new" as consumed by the last reaction, in actual practice it may be desirable to maintain an excess of CME in the second closed container; even cycle the formation of new CME, such as by alternating between regeneration (only) and formation-generation steps at the end of the chloromethylation reactions.

In the following examples all parts were by weight:

EXAMPLE 1

In this experiment, a chloromethylation reaction is conducted in a first closed container, CME is distilled into and stored in a second closed container, chloromethylated vinyl aromatic resin product is removed from the first container, and CME is reintroduced from the second to the first container for the next batch.

To a dry reactor equipped with means for introduction of solids and of liquid, a stirrer, a means for external temperature control, a reflux condenser with cooling capacity capable of containing CME, methylal and hydrogen chloride vapors, a means for educing off-gasses into a caustic scrubber, a means for sealing the reactor, and a means for applying vacuum, was charged 106 parts (one equivalent) of a gellular bead polymer of average particle size about 0.5 mm. The polymer was a copolymer of styrene with 6.9% commercial divinylbenzene, and was prepared by the process of U.S. 4,192,921. There was then charged 453 parts of CME, which contained 20% by weight of methylal, and the mixture was stirred for one hour at room temperature. There was then charged 27.96 parts dry ferric oxide catalyst for the chloromethylation reaction as quickly as possible while stirring; the reactor was again sealed, and was heated to 55° C. over 45 minutes, and maintained at that temperature for an additional six hours.

The batch was then cooled to 15°-20° C., and 30 parts methanol, 120 parts Methyl Formcel (formaldehyde/methanol/water in a 55/35/10 weight ratio), were added at a rate so that the temperature did not exceed 25° C. External cooling was provided. The mixture was stirred for one hour, vacuum checked for leaks, the pressure in the reactor lowered to 720 mm Hg, and HCl gas (178.9 parts) was added while maintaining the temperature below 30° C. and the pressure below 2.0 psig (870 mm Hg). The addition of HCl took about 2.5 hours, and the batch was held for 60 minutes additional at room temperature.

The batch was vented, and transferred without exposure to the atmosphere to a vessel (acting for laboratory purposes as the first closed container) equipped with thermometer, stirrer, means for external heating, a distillation column equipped with water-cooled and brine-cooled condensers, and a second closed container which acts as a receiver for the distillate, said second closed container being attached to a source of vacuum with a device for regulating pressure.

The batch was sampled for analysis by gas-liquid chromatography, and the pressure reduced to 720 mm. The sample was heated as required to maintain distillation until a batch temperature of 70° C. was reached. The pressure was lowered to 300 mm. absolute and heating and distillation continued for 45 minutes.

The distillate was conveyed from the second closed container via a closed system, separated from any aqueous layer via a separatory funnel, the volume of CME and the amount of methylal present determined, and the organic liquid returned to the first closed reactor to begin a second chloromethylation. There was recovered 364 parts of chloromethyl methyl ether and 91 parts of methylal.

EXAMPLE 2

To the reactor described in Example 1 was charged 106 parts (one equivalent) of a gellular bead polymer of average particle size about 0.5 mm. The polymer was a copolymer of styrene with 5.3% commercial divinylbenzene, and was prepared by the process of U.S. 4,582,859. There was then charged 503 parts of chloromethyl methyl ether, which contained 12% methylal, and the mixture was stirred for one hour at room temperature. There was then charged 23.96 parts dry ferric oxide as quickly as possible while stirring; the reactor was again sealed, and was heated to 55° C. over 45 minutes, and maintained at that room temperature for an additional six hours.

The batch was then cooled to 15°-20° C., and 12.5 parts methanol, 226.4 parts Methyl Formcel (formaldehyde/methanol/water in a 55/35/10 weight ratio), and 6.8 parts water were added at a rate so that the temperature did not exceed 25° C. External cooling was provided. The mixture was stirred for one hour, vacuum checked for leaks, the pressure in the reactor lowered to 720 mm Hg, and HCl gas (158.4 parts) was added while maintaining the temperature below 30° C. and the pressure below 2.0 psig (870 mm Hg). The addition of HCl took about 2.5 hours, and the batch was held for 60 minutes additional at room temperature.

The batch was vented, and transferred without exposure to the atmosphere to the vessel for distillation described in Example 1. The batch was sampled for analysis by gas-liquid chromatography, and the pressure reduced to 720 mm. The sample was heated as required to maintain distillation until a batch temperature of 70° C. was reached. The pressure was lowered to 300 mm. absolute and heating and distillation continued for 45 minutes.

The distillate was conveyed from the receiver via a closed system, separated from any aqueous layer via a separatory funnel, the volume of CME and the amount of methylal present determined, and the organic liquid returned to the first reactor to begin a second chloromethylation.

The slurry remaining after distillation was cooled to 20° C., and a slow addition of 250 parts water was begun, while maintaining the temperature below 20° C. The aqueous layer was separated, the polymer washed three times by stirring with 500 parts water for 15 minutes, then treated with 15 parts of 50% aqueous sodium hydroxide in 500 parts of water.

EXAMPLE 3

The slurry of chloromethylated polymer of Example 2 (770 parts) was added to a reactor equipped for external cooling, with stirrer, means for addition of liquids, a vessel from which trimethylamine can be distilled into the reactor, and a vented line scrubbed with dilute acid. The slurry was cooled to 15° C., and 10 parts 50% aqueous sodium hydroxide added, followed by slow distillation of 82.67 parts anhydrous trimethylamine into the reactor over a two hour period. The reactor was stirred and the temperature maintained at 15° C. throughout the addition. The temperature was then allowed to increase to 28° C. over a 1.5 hour period, and the reaction held at that temperature for six hours. Excess trimethylamine was then removed over four hours by a vacuum stripping operation; the resin was washed with water, drained, and dried in vacuo.

By analysis by techniques described, inter alia, in Kunin, "Ion Exchange Resins", Krieger Publishing Co., Malabar, Florida, 1985 reprint of 1970 second edition, the anion exchange capacity, % perfect beads as noted by visual evaluation, Chatillon physical crush strength of the resin (in hydroxide form), and the % solids of the drained wet beads was at least equivalent to a similar resin made via the above chloromethylation reaction but without the operations of generating chloromethyl methyl ether in the presence of the resin and distilling same. Further, when the distilled chloromethyl methyl ether was used to prepare more chloromethylated beads, said beads after amination exhibited chemical and physical performance essentially equivalent to resin made from fresh (un-recycled) chloromethyl methyl ether, said second resin never being exposed to distillation/stripping conditions.

EXAMPLE 4

In this example, the starting material was a macroporous polymer prepared with 3% commercial divinylbenzene and 40% methyl amyl alcohol precipitant via the method of U.S. Pat. No. 4382124.

To a dry reactor as described in Examples 1 and 2 was charged 53 parts of the macroporous polymer described above of average particle size about 0.5 mm. There was then charged 350 parts of a chloromethyl methyl ether-methylal mixture which contained 20% methylal, and the mixture was stirred for one hour at room temperature. There was then charged 26.95 parts dry ferric oxide as quickly as possible while stirring; the reactor was again sealed, and the temperature raised to 55° C. with control of external heating over 45 minutes, and maintained at that temperature for an additional six hours.

The batch was then cooled to 15°-20° C., and 34.4 parts methanol and 109.1 parts Methyl Formcel (formaldehyde/methanol/water in a 55/35/10 weight ratio) were added at a rate so that the temperature did not exceed 25° C. External cooling was provided. The mixture was stirred for one hour, vacuum checked for leaks, the pressure in the reactor lowered to 720 mm Hg, and HCl gas (130 parts) was added while maintaining the temperature below 30° C. and the pressure below 2.0 psig (870 mm Hg). The addition of HCl took about 2.5 hours, and the batch was held for 60 minutes additional at room temperature.

The batch was vented, and transferred without exposure to the atmosphere to the distillation vessel described in Examples 1 and 2. The batch was sampled for analysis by gas-liquid chromatography, and the pressure reduced to 720 mm. The sample was heated as required to maintain distillation until a batch temperature of 70° C. was reached. The pressure was lowered to 300 mm. absolute and heating and distillation continued for 90 minutes.

The distillate was conveyed from the receiver via a closed system, the volume of CME and the amount of chomethylal present determined, and the organic liquid returned to the first reactor to begin a second chloromethylation. The distillate (391 parts) was of a volume and purity sufficient for a complete second batch; it was analyzed by gas chromatography as containing 76.2% chloromethyl methyl ether, 20.3% methylal, 0.10% bis(chloromethyl methyl ether), 0.29% methyl chloride and 0.13% chloromethoxymethyl methyl ether.

The solid remaining after distillation was cooled to 20° C., and a slow addition of 250 parts water was begun, while maintaining the temperature below 20° C. The aqueous layer was separated, the resin washed three times by stirring with 500 parts water for 15 minutes, then treated with 15 parts of 50% aqueous sodium hydroxide.

EXAMPLE 5

The chloromethylated polymer of Example 4, when treated with 35.5 parts trimethylamine by the process of Example 3, yielded a resin with anion exchange capacity, bead appearance, and crush resistance at least equivalent to a commercial anion exchange resin prepared without the chloromethyl methyl ether generative/distillative steps of Example 4.

EXAMPLE 6

The equipment described in Example 1 was charged 106 parts (one equivalent) of a gellular bead polymer of average particle size about 0.5 mm. The polymer was a copolymer of styrene with 5.3% commercial divinylbenzene, and was prepared by the process of U.S. 4,582,859. There was then charged 425 parts of chloromethyl methyl ether, which contained 12% methylal, and the mixture was stirred for one hour at room temperature. There was then charged 20.76 parts dry ferric oxide as quickly as possible while stirring; the reactor was again sealed, and was heated to 55° C.. over 45 minutes, and maintained at that temperature for an additional six hours.

The batch was then cooled to 15°-20° C., and 4.8 parts methanol and 172 parts Methyl Formcel were added at a rate so that the temperature did not exceed 25° C. External cooling was provided. The mixture was stirred for one hour, vacuum checked for leaks, the pressure in the reactor lowered to 720 mm Hg, and HCl gas (175.2 parts) was added while maintaining the temperature below 30° C. and the pressure below 2.0 psig (870 mm Hg). The addition of HCl took about 2.5 hours, and the batch was held for 60 minutes additional at room temperature.

Distillation and work-up as in Example 2; there was obtained 451.7 parts of distillate analyzed as 87.4% chloromethyl methyl ether, 13.7% methylal, 0.15% bis(chloromethyl ether), 0.94% methyl chloride, and 0.07% chloromethyloxymethyl methyl ether.

The chloromethylated polymer was aminated by means similar to those discussed in Examples 3 and 5 to produce an efficient strong base resin.

EXAMPLE 7

The process of Example 4 is repeated with a resin prepared by a similar process but with a second phase containing 2% acrylonitrile and 5.9% commercial divinylbenzene. A quantity of chloromethyl methyl ether is generated sufficient to prepare a second batch of chloromethylated resin, and the resulting chloromethylated product can be aminated to prepare a useful strong base resin by the process of Example 3.

EXAMPLE 8

Polymer prepared by the process of Example 4 may also be converted to a weak base resin by treatment with an excess of dimethylamine and sodium hydroxide under pressure for about 6 hours at about 75° C. After cooling and venting, the excess dimethylamine is distilled at ca. 100° C., the resin is cooled, washed with water, and drained to produce a polymer with weak base capacity.

EXAMPLE 9

The process of Example 2 was repeated but with the following variations in reaction conditions; moles are based on one mole (106 parts) of polymer. In all examples, when the chloromethylated polymer was treated with trimethylamine by the process of Example 3, a useful strong base resin of total anion exchange capacity of 4 to 4.4 meq./gram was obtained. Also, an amount of chloromethyl methyl ether sufficient for repeated runs was formed in all cases. MeAl=methylal.

TABLE 1

| Sample | CME (mols) | $Fe_2O_3$ (mols) | MeAl (mols) | T, °C. (of reaction) |
|---|---|---|---|---|
| 9A | 5.5 | 0.15 | 0.65 | 55 |
| 9B | 5.5 | 0.15 | 0.65 | 40 |
| 9C | 5.5 | 0.15 | 1.0 | 55 |
| 9D | 4.5 | 0.15 | 0.65 | 55 |
| 9E | 5.5 | 0.10 | 0.65 | 55 |

EXAMPLE 10

The general process of Example 4 was followed, but with $FeCl_3$ (anhydrous) as catalyst. When treated with trimethylamine by the procedure of Example 5, the resins exhibited performance similar to that of the resin of Example 5, and sufficient chloromethyl methyl ether was recovered for continuation of the chloromethylation cycle.'

TABLE 2

| Sample | CME (mols) | $FeCl_3$ (mols) | MeAl (mols) | T, °C. (of reaction) |
|---|---|---|---|---|
| 10A | 6.5 | 0.25 | 15% | 55 |
| 10B | 6.5 | 0.35 | 15% | 55 |
| 10C | 6.5 | 0.30 | 10% | 55 |

EXAMPLE 11

The preparation of Example 10, Sample 10A was repeated, but distillation of the chloromethyl methyl ether was continued until a temperature of 90° C. at 720 mm. Although resin capacity after amination was unaffected, the "perfect bead" visual count was zero.

EXAMPLE 12

To the reactor system of Example 1 is charged 106 parts of a spherical, gellular polystyrene polymer containing 6% divinylbenzene and 275 parts of chloromethyl methyl ether containing 21.5 parts methylal. The beads are allowed to swell for one hour, then a solution of 90.8 parts aluminum chloride in 68 parts chloromethyl methyl ether is added over a period of two hours, the reactor temperature being maintained at about room temperature. The reaction is stirred for two additional hours after catalyst addition is completed, and the liquid portion of the mixture is drained off. The beads are washed with 304 parts methylal, and that methylal is combined with the initial drainings and then allowed to react with 113.5 parts concentrated (35%) hydrochloric acid. The mix is stirred for one hour, and then distilled as in Example 1. The mixture of chloromethyl methyl ether and methylal so obtained is distilled with an appropriate fractionating column to remove excess methylal, and the remaining chloromethyl methyl ether is recycled to the next chloromethylation.

We claim:

1. A process comprising introducing in a first closed container a mixture of a vinyl aromatic resin chloromethylation catalyst and chloromethyl methyl ether in proportions to insure chloromethylation of the aromatic material and then:
   a. heating and stirring the mixture for sufficient time to substantially complete the chloromethylation reaction,
   b. introducing formaldehyde, methanol, and hydrogen chloride in proportions stoichiometrically sufficient to produce at least about as much new chloromethyl methyl ether as that consumed by the chloromethylation reaction in a. above, and reacting the same to produce additional chloromethyl methyl ether within the first closed container,
   c. distilling substantially all the chloromethyl methyl ether from said first closed container into a second closed container,
   d. removing chloromethylated aromatic product from said first closed container,
   e. introducing a new batch of vinyl aromatic resin and catalyst for the chloromethylation reaction to said first closed container, and
   f. introducing to said first closed container, as the source of chloromethyl methyl ether for chloromethylation of said new batch of vinyl aromatic resin, said chloromethyl methyl ether from said second closed container.

2. Process of claim 1 where the vinyl aromatic resin is a copolymer of styrene with divinylbenzene and ethylvinylbenzene.

3. Process of claim 1 where the process is conducted in the substantial absence of solvent or swelling agent for the vinyl aromatic resin other than chloromethyl methyl ether.

4. Process of claim 1 where the process is conducted in the presence of a swelling solvent for the vinyl aromatic resin.

5. Process of claim 4 where the amount of chloromethyl methyl ether measured in equivalents is from at least two to at least about twenty times that of the vinyl aromatic resin.

6. Process of claim 5 where the amount of chloromethyl methyl ether is from about four to about nine equivalents.

7. Process of claim 1 where the catalyst is ferric oxide.

8. Process of claim 1 where the catalyst level is from about 0.05 equivalents to about 0.7 equivalents per equivalent of resin.

9. Process of claim 1 where the catalyst level is from about 0.10 equivalents to about 0.40 equivalent.

10. Process of claim 1 where the methanol and formaldehyde added after chloromethylation are supplied by the addition of methylal.

11. Process of claim 1 where the hydrogen chloride is added as a gas subsequent to the addition of formaldehyde and methanol.

12. Process of claim 1 where the amount of methanol is from about 2 to about 5 equivalents, the amount of formaldehyde is from 2 equivalents to about 6 equivalents, and the amount of hydrogen chloride is from about 4 to about 8 equivalents.

13. Process of claim 1 where the hydrogen chloride is added as an aqueous solution.

14. Process of claim 1 where the vinyl aromatic resin and the unreacted chloromethyl methyl ether are separated by distillation of the chloromethylation reaction mixture.

* * * * *

UNITED STATES PATENT AND TRADEMARK OFFICE
CERTIFICATE OF CORRECTION

PATENT NO. : 4,900,796
DATED : February 13, 1990
INVENTOR(S) : Scott A. Berger et al.

It is certified that error appears in the above-identified patent and that said Letters Patent is hereby corrected as shown below:

Column 4, line 53 reads "U.S. Pat. No. 124"

it should read -- U.S. Pat. No. 4,382,124 --.

Signed and Sealed this

Twenty-seventh Day of November, 1990

Attest:

HARRY F. MANBECK, JR.

*Attesting Officer*            *Commissioner of Patents and Trademarks*